United States Patent
Rogers et al.

(10) Patent No.: US 10,567,650 B2
(45) Date of Patent: *Feb. 18, 2020

(54) MOTOR CONTROL SYSTEM FOR A SELF-CALIBRATING MULTI-CAMERA ALIGNMENT SYSTEM

(71) Applicant: SNAP-ON Incorporated, Kenosha, WI (US)

(72) Inventors: Steven W. Rogers, Conway, AR (US); Eric F. Bryan, Conway, AR (US); Adam C. Brown, Maumelle, AR (US); Brandon J. McGinley, Conway, AR (US); Eric R. Sellers, Conway, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,512

(22) Filed: Jan. 25, 2019

(65) Prior Publication Data

US 2019/0158740 A1    May 23, 2019

Related U.S. Application Data

(63) Continuation of application No. 14/463,599, filed on Aug. 19, 2014.

(Continued)

(51) Int. Cl.
*G01B 11/275* (2006.01)
*H04N 5/232* (2006.01)

(52) U.S. Cl.
CPC ..... *H04N 5/23238* (2013.01); *G01B 11/2755* (2013.01); *G01B 2210/143* (2013.01);
(Continued)

(58) Field of Classification Search
None
See application file for complete search history.

(56) References Cited

U.S. PATENT DOCUMENTS 5,828,986 A    10/1998  Horigome et al.
6,298,284 B1 * 10/2001  Burns, Jr. ............ G01B 11/275
                                                                356/139

(Continued)

FOREIGN PATENT DOCUMENTS

| CN | 101351683 A | 1/2009 |
| CN | 101790678 A | 7/2010 |
| DE | 202013101016 U1 | 6/2013 |

OTHER PUBLICATIONS

Notification of Transmittal of the International Search Report and the Written Opinion of the International Searching Authority for International Application No. PCT/US2014/051753 dated Dec. 18, 2014.

(Continued)

*Primary Examiner* — William C Vaughn, Jr.
*Assistant Examiner* — Joseph Daniel A Towe
(74) *Attorney, Agent, or Firm* — Miles & Stockbridge, P.C.

(57) ABSTRACT

Embodiments include a method for autonomous camera pod tracking of a vehicle during vehicle alignment. The method can include receiving, at a processor of an autonomous camera pod, at least one of vehicle target image data from a vehicle target camera or calibration target image data from a calibration camera, the vehicle target camera being adapted to acquire images of a target mounted to the vehicle, and the calibration camera being adapted to acquire images of a calibration target mounted to a sister autonomous camera pod. An optimal location of the autonomous camera pod can be calculated based on the received vehicle target image data or calibration target image data. The method can (Continued)

include transmitting, when it is determined to move the autonomous camera pod, a motor command to a motor drive of the autonomous camera pod, thereby causing the autonomous camera pod to move to the optimal location.

20 Claims, 8 Drawing Sheets

Related U.S. Application Data

(60) Provisional application No. 61/867,283, filed on Aug. 19, 2013.

(52) U.S. Cl.
CPC ...... *G01B 2210/16* (2013.01); *G01B 2210/20* (2013.01); *G01B 2210/26* (2013.01)

(56) References Cited

U.S. PATENT DOCUMENTS

| | | | |
|---|---|---|---|
| 6,341,013 B1* | 1/2002 | Battiti | G01B 11/2755 356/139.09 |
| 6,447,236 B1 | 9/2002 | Grams et al. | |
| 6,731,382 B2* | 5/2004 | Jackson | G01B 11/2755 33/203.19 |
| 6,968,282 B1 | 11/2005 | Jackson et al. | |
| 7,424,387 B1 | 9/2008 | Gill et al. | |
| 7,793,126 B2* | 9/2010 | McGrane | G06F 1/26 713/300 |
| 7,855,783 B2 | 12/2010 | Kling, III et al. | |
| 2002/0027651 A1* | 3/2002 | Jackson | G01B 11/2755 356/139.09 |
| 2002/0189115 A1 | 12/2002 | Jackson et al. | |
| 2008/0250842 A1 | 10/2008 | Nobis et al. | |
| 2009/0024272 A1 | 1/2009 | Rogers et al. | |
| 2009/0073425 A1* | 3/2009 | Kling, III | G01B 11/2755 356/139.09 |
| 2012/0256566 A1* | 10/2012 | Chaffee | G05B 19/056 318/34 |
| 2013/0194446 A1 | 8/2013 | Cerruti et al. | |
| 2013/0229159 A1* | 9/2013 | Daley | G05F 1/12 323/255 |
| 2014/0201571 A1* | 7/2014 | Hosek | G06F 11/2257 714/26 |

OTHER PUBLICATIONS

Notification of Transmittal of the International Search Report and the Written Opinion of the International Searching Authority for International Application No. PCT/US2014/051754 dated Dec. 18, 2014.

Extended European Search Report dated Mar. 16, 2017 for European Application No. 14837729.4.

Office Action dated Jan. 10, 2018 issued for Chinese Patent Application No. 201480048836.7.

* cited by examiner

MOTOR CONTROL SYSTEM FOR A SELF-CALIBRATING MULTI-CAMERA ALIGNMENT SYSTEM

RELATED APPLICATIONS

The present application claims priority to U.S. Provisional Application No. 61/867,283, entitled "Improved Motor Control System For A Self-Calibrating Multi-Camera Alignment System," filed Aug. 19, 2013, and U.S. patent application Ser. No. 14/463,599, entitled "Motor Control System For A Self-Calibrating Multi-Camera Alignment System" filed Aug. 19, 2014 which are incorporated herein by reference in there entirety.

FIELD

Embodiments relate generally to machine vision vehicle wheel alignment systems and methods, and more particularly to machine vision alignment systems having movable cameras that continuously self-calibrate their position relative to that of vehicle-mounted targets.

BACKGROUND

Machine vision vehicle alignment systems using movable cameras and targets attached to vehicle wheels are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one vehicle mounted target viewing camera to another. This type of system is described in U.S. Pat. Nos. 6,931,340, 6,959,253 and 6,968,282, all of which are hereby incorporated by reference herein.

Real time alignment reading response is necessary for effective operation of an alignment system. Accordingly, a need exists for a system that tracks the movement of the vehicle mounted targets and responds quickly and smoothly with corresponding movements of the viewing cameras, with the goal of maintaining optimal field of view. Further, a need exists for the camera control process not to slow the overall system performance or place extra demand on core system processing.

There is also a need to provide additional safety features to prevent injury to the user who might come into contact with moving camera assemblies.

Finally, there is a need to extend the functional life of the system by providing component diagnostics and optimal operation control.

SUMMARY

One or more embodiments can include a vehicle alignment system utilizing camera pods adapted to autonomously track a vehicle. The system comprises first and second supporting tracks. A first autonomous camera pod is mounted to the first track to move autonomously along a first length of the first track. The first autonomous camera pod comprises a first motor drive adapted to move the first autonomous camera pod along the first length of the first track, a first camera adapted to capture image data of a first target mounted to the vehicle, the first camera generating first image data, a calibration target disposed in a fixed relationship to the first camera, and a first data processor.

A second autonomous camera pod is mounted to the second track to move autonomously along a second length of the second track. The second autonomous camera pod comprises a second motor drive adapted to move the second autonomous camera pod along the second length of the second track, a second camera adapted to capture image data of a second target mounted to the vehicle, the second camera generating second image data, a calibration camera disposed in a fixed relationship to the second camera adapted to capture image data of the calibration target, the calibration camera generating calibration image data, and a second data processor.

The first data processor of the first autonomous camera pod is adapted to receive the first image data from the first camera, autonomously determine, based at least in part on the first image data, whether to cause the first autonomous camera pod to move along the first length of the first track, and transmit, when the first data processor determines to cause the first autonomous camera pod to move along the first length of the first track, a first motor command to the first motor drive thereby causing the first autonomous camera pod to move along the first length of the first track. The second data processor of the second autonomous camera pod is adapted to receive at least one of the second image data from the second camera or the calibration image data from the calibration camera, autonomously determine, based at least in part on at least one of the second image data or the calibration image data, whether to cause the second autonomous camera pod to move along the second length of the second track, and transmit, when the second data processor autonomously determines to cause the second autonomous camera pod to move along the second length of the second track, a second motor command to the second motor drive, thereby causing the second autonomous camera pod to move along the second length of the second track.

Embodiments can further include a method for tracking a vehicle during vehicle alignment. The method comprises providing a vehicle alignment system comprising first and second supporting tracks, a first autonomous camera pod mounted to the first track and comprising a first motor drive and a first camera to image a first target mounted to the vehicle, and a second autonomous camera pod mounted to the second track and comprising a second motor drive, a second camera, and a calibration camera.

The method further comprises acquiring, by the first camera, an image of the first target mounted to the vehicle; receiving, at a first data processor of the first autonomous camera pod, first image data from the first camera; calculating, at the first data processor, a first optimal location of the first autonomous camera pod; determining, at the first data processor, whether to move the first autonomous camera pod; and transmitting, by the first data processor, when the first data processor determines to move the first autonomous camera pod, a first motor command to the first motor drive thereby causing the first autonomous camera pod to move along a first length of the first track to the first optimal location.

The method further comprises acquiring, by the second camera, an image of a second target mounted to the vehicle or, by the calibration camera, an image of a calibration target mounted to the first autonomous camera pod; receiving, at a second data processor of the second autonomous camera pod, second image data from the second camera or calibration image data from the calibration camera; calculating, at the second data processor, an optimal location of the second autonomous camera pod based on the received second image data or calibration image data; determining, at the second data processor, whether to move the second autonomous camera pod; and transmitting, by the second data processor, when the second data processor determines to move the second autonomous camera pod, a second motor command to the second motor drive thereby causing the second autonomous camera pod to move along a second length of the second track to the second optimal location.

Embodiments can further comprise a non-transitory computer readable medium having instructions stored thereon that, when executed by a processor of an autonomous camera pod mounted to a supporting track, cause the processor to track a vehicle during vehicle alignment, the autonomous camera pod being mounted to the track to move along a length of the track. The tracking comprises receiving at least one of vehicle target image data from a vehicle target camera or calibration target image data from a calibration camera, the vehicle target camera being adapted to acquire images of a target mounted to a vehicle, the calibration camera being adapted to acquire images of a calibration target mounted to a sister autonomous camera pod; calculating an optimal location of the autonomous camera pod based on the received vehicle target image data or calibration target image data; determining, responsive to the calculating, whether to move the autonomous camera pod; and transmitting, when it is determined to move the autonomous camera pod, a motor command to a motor drive of the autonomous camera pod, thereby causing the autonomous camera pod to move along the length of the track to the optimal location.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

Figure 1:
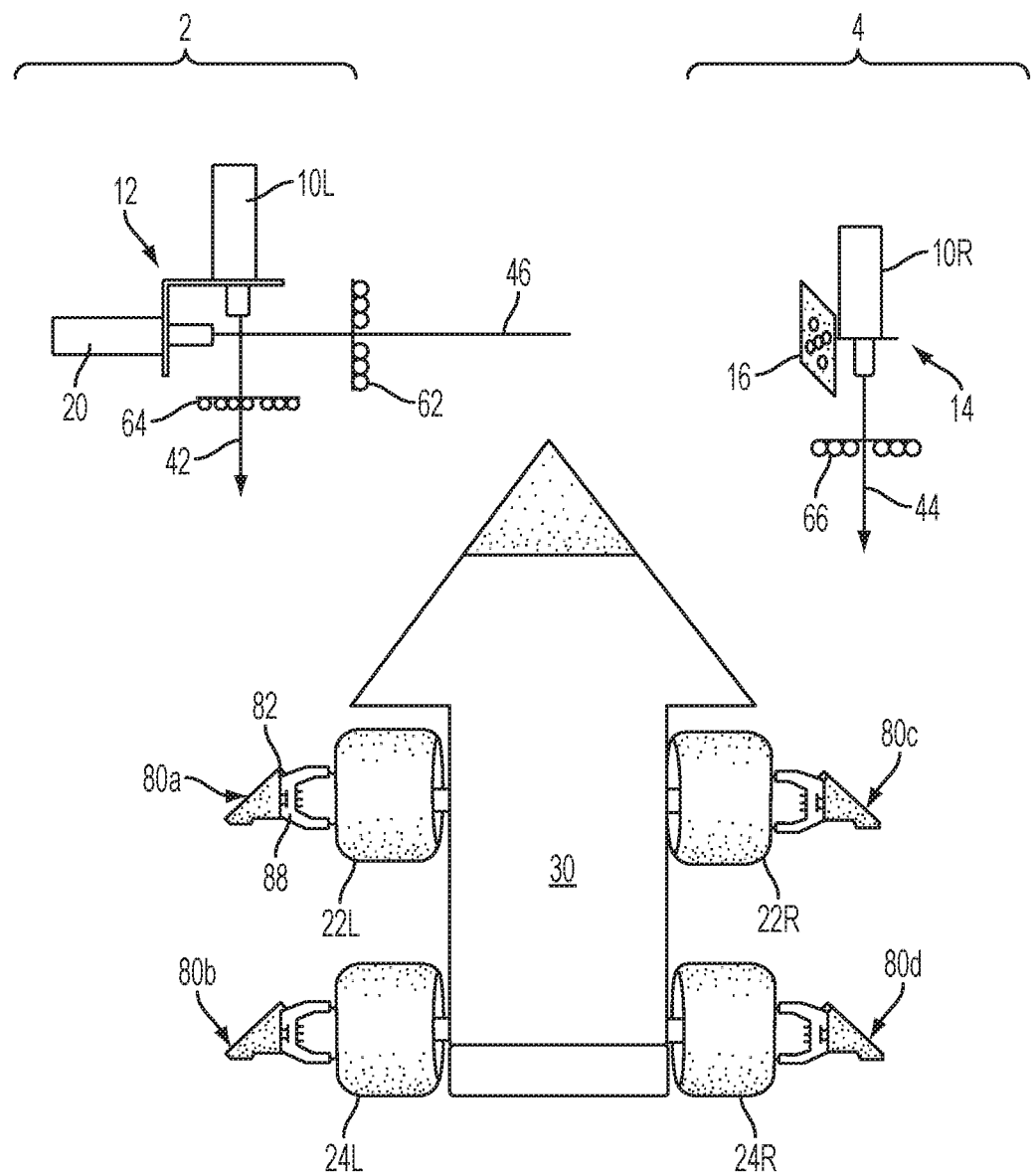
FIG. 1 is a schematic top plan view of a conventional 3D motor vehicle alignment system.
Figure 2:
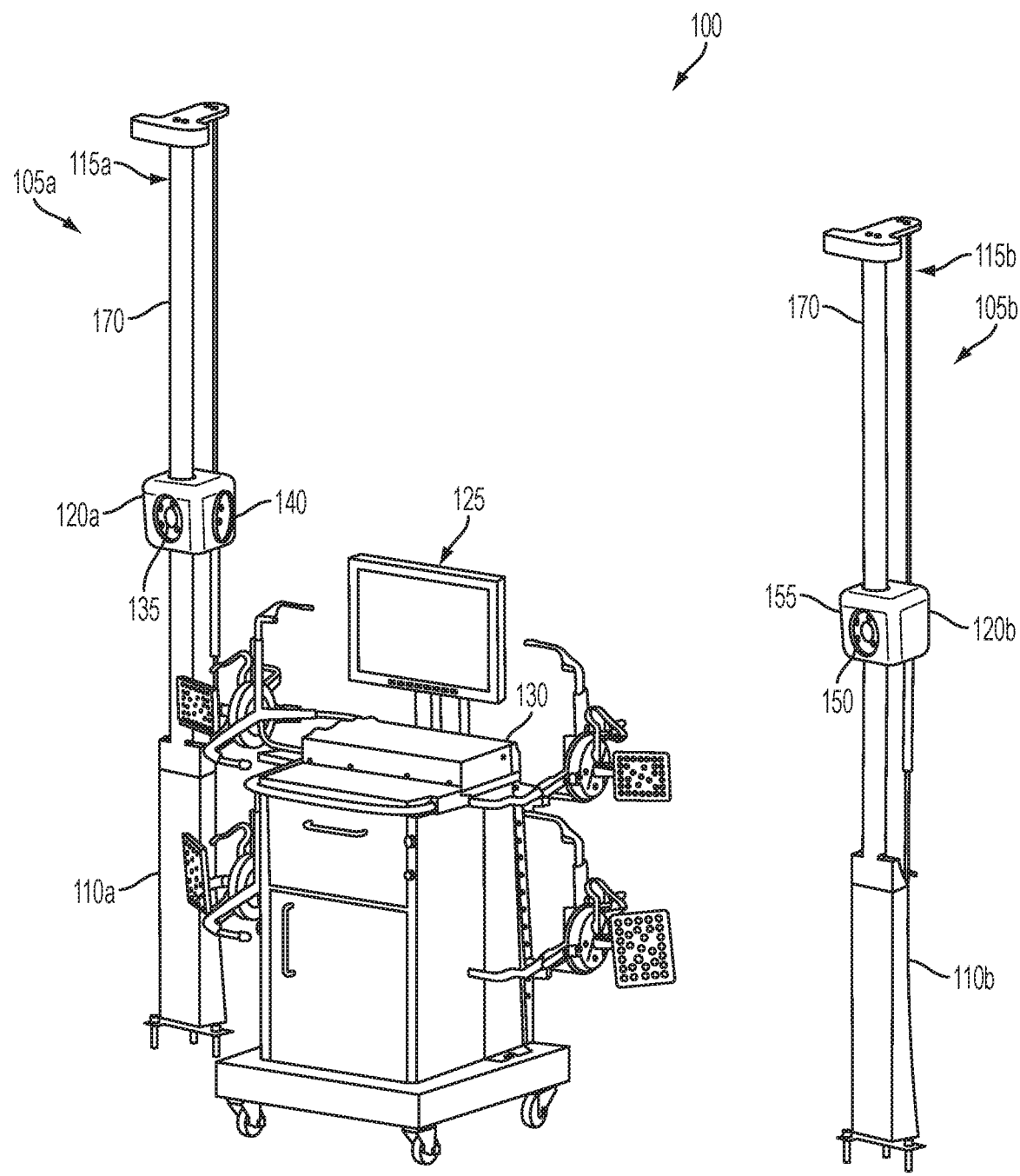
FIG. 2 is a front perspective view diagrammatically illustrating an exemplary alignment system according to various embodiments.

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

This disclosure describes embodiments of a vehicle alignment system comprising cameras not rigidly fixed with respect to each other and oriented to view vehicle wheel mounted targets for the purpose of calculating wheel alignment angles.

Real time processing speed is critical to the function of an alignment system, so that there is no discernible delay to the user between suspension adjustment and display results. It is advantageous to minimize any extra processing in support of this goal. According to one aspect of this disclosure, on board processing capability of the cameras is used to direct the movement of the camera assembly to maintain optimal field of view of the wheel mounted targets.

Movement control of the cameras requires tracking of the wheel mounted targets to maintain an optimal field of view. If one or more of the targets is not visible to the controlling cameras for any reason, the system can become disoriented and tracking control lost. According to another aspect of this disclosure, a plane can be determined describing the orientation of all targets so that if the view of one or more targets is lost, the system can maintain tracking control so long as one target remains visible.

Personnel safety is critical, especially when a system is under automated movement control, as in the case of camera assemblies tracking targets. According to another aspect of this disclosure, camera assembly movement is stopped if a predetermined increase in movement resistance is encountered, indicating the possibility of a user blocking the movement. In a further aspect, for safety the system detects manual movement of a camera assembly by a user and locks the system from any automated movement for a predetermined time period.

System reliability is also of critical importance to the user. According to a further aspect of this disclosure, the useful life of the electric motor driving the camera assembly movement is extended by implementing soft start/stop through logic embedded in a motor control board. In a further aspect, an increase in camera assembly movement resistance is detected and displayed to the user with a message that service is required. This can prevent system or component failure which could occur if the problem is not addressed in a timely manner. The same diagnostic and reporting process can be extended to any data measurable by the motor control board.

Movement coordination between the cameras viewing the wheel mounted targets is necessary to maintain field of view to the targets and between cameras. Another aspect of this disclosure is the designation of a single master camera assembly that views the second camera assembly and controls its movement so that independent calibration and control are not required.

FIG. 1 is a schematic top plan view of certain elements of a conventional computer-aided, 3D motor vehicle wheel alignment system ("aligner"), such as disclosed in U.S. Pat. No. 6,968,282 discussed herein above. This aligner has elements in common with the presently disclosed aligner, which elements will now be described. The aligner of FIG. 1 generally comprises a left camera module 2 and a right camera module 4 that are used to align wheels of a motor vehicle. The terms "left" and "right" are used for convenience, and are not intended to require a particular element to be located in a particular location or relationship with respect to another element.

Arrow 30 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 22R, 24L, 24R, respectively. Each alignment target generally comprises a plate 82 on which target information is imprinted and a clamping mechanism 88 for securing the target to a wheel.

The left camera module 2 comprises a left alignment camera 10L and a calibration camera 20. Left alignment camera 10L faces the vehicle and views the left side targets 80a, 80b along axis 42. Camera 10L is rigidly mounted to left rigid mount 12. A calibration camera 20 faces the right camera module 4 and views a calibration target 16 along axis 46. The calibration camera 20 also is affixed rigidly to mount 12. In this exemplary embodiment, calibration camera 20 is illustrated as forming a part of left camera module 2. However, the calibration camera 20 also may be configured as part of right camera module 4, in which case its view would be directed leftward toward left camera module 2.

Right camera module 4 comprises a right camera 10R that faces the vehicle and functions as a second alignment camera in a 3D alignment system. Right camera 10R is affixed to a rigid camera mount 14. Calibration target 16 is rigidly affixed to camera mount 14 in a position visible to calibration camera 20 along axis 46.

Calibration camera 20 and left camera 10L are fixed in pre-determined, known positions. Similarly, right camera 10R and calibration target 16 are fixed in pre-determined, known positions. Thus, the relative position of calibration camera to left camera 10L is known, and the relative position of right camera 10R to calibration target 16 is also known.

For illuminating the calibration target 16 and wheel targets 80a-80d, left camera module 2 and right camera module 4 further may comprise light sources 62, 64, 66. A first light source 62 is aligned perpendicular to axis 46 to direct light along that axis to illuminate calibration target 16; a second light source 64 is aligned perpendicular to axis 42 to direct light along that axis to illuminate left side wheel targets 80a, 80b; and a third light source 66 is aligned perpendicular to axis 44 to direct light along that axis to illuminate right side wheel targets 80c, 80d. Each of the light sources 62, 64, 66 can comprise a plurality of light-emitting diodes (LEDs); however, any other light source may be used.

Exemplary imaging alignment systems according to the present disclosure will now be described with reference to FIGS. 2-7. In an exemplary embodiment shown in FIGS. 2-7, a portable vehicle alignment system 100 comprises a pair of base tower assemblies 105a, 105b, each base tower assembly 105a, 105b comprising a pedestal 110a, 110b, a columnar tower 115a, 115b removably attachable to a top portion of the pedestal 110a, 110b to extend substantially vertically upward from the pedestal 110a, 110b, and a camera pod 120a, 120b mounted to move along a length of the tower 105a, 105b. System 100 further comprises a data processor 125 for processing image data from the camera pods 120a, 120b, and in certain embodiments having a built-in wireless communication device 130. Data processor 125 comprises, for example, a conventional personal computer (PC). Likewise, the wireless communication devices referred to herein are conventional devices known to those of skill in the art; for example, devices using standard Bluetooth communications protocol. Data processor 125 is used, for example, to display the alignment readings to a user and/or calculate alignment values.

Figure 3A:
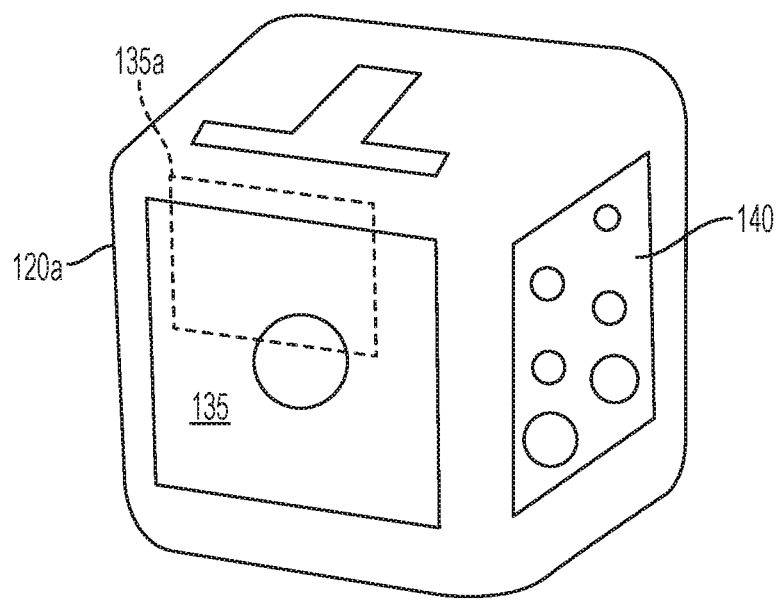
FIGS. 3A and 3B are perspective views diagrammatically illustrating exemplary camera pods according to various embodiments.
Figure 3B:
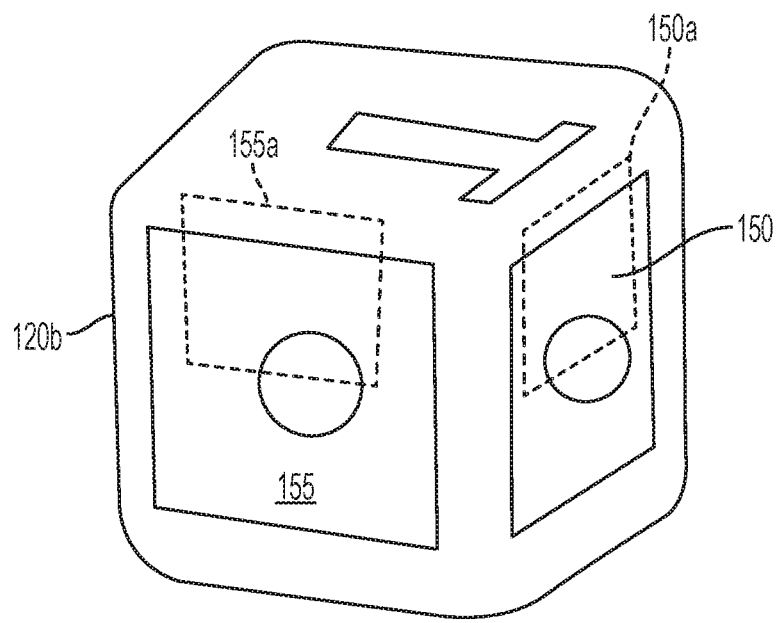

Referring now to FIG. 3A, a first one of the camera pods 120a comprises a first camera 135 for capturing image data of a first target, such as target 80a mounted on a vehicle 30 as shown in FIG. 1. First camera pod 120a also comprises a calibration target 140 disposed in a fixed relationship to the first camera 135. As shown in FIG. 3B, a second one of the camera pods 120b comprises a second camera 150 for capturing image data of a second target, such as target 80b mounted on vehicle 30 as shown in FIG. 1. Second camera pod 120b also comprises a calibration camera 155 disposed in a fixed relationship to the second camera 150 for capturing images of the calibration target 140. All the cameras 135, 150, 155 can be conventional cameras well-known to those of skill in the art; for example, CCD cameras.

Figure 3C:
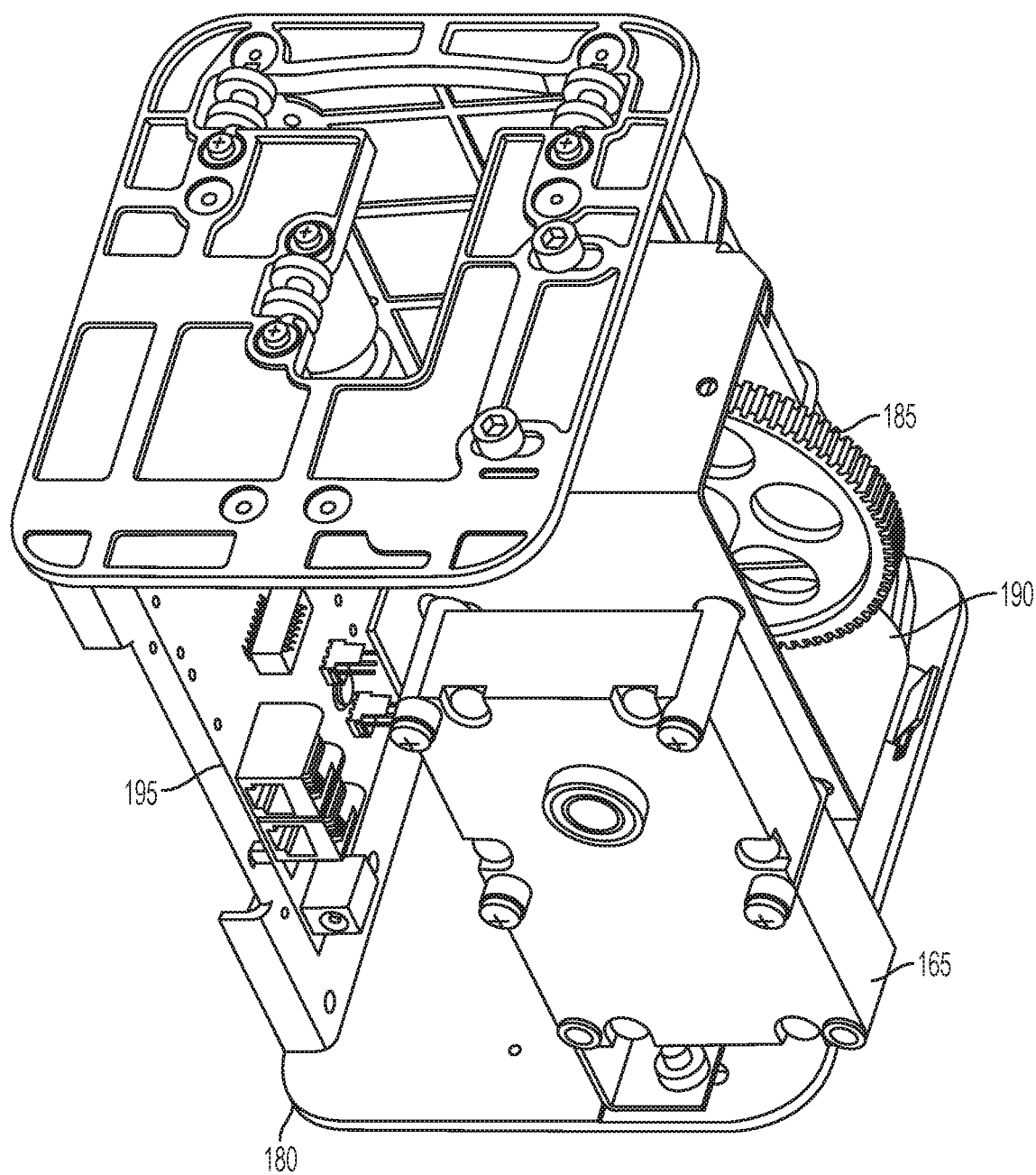
FIG. 3C is a perspective view diagrammatically illustrating an exemplary slide car of a camera pod according to various embodiments.
Figure 4:
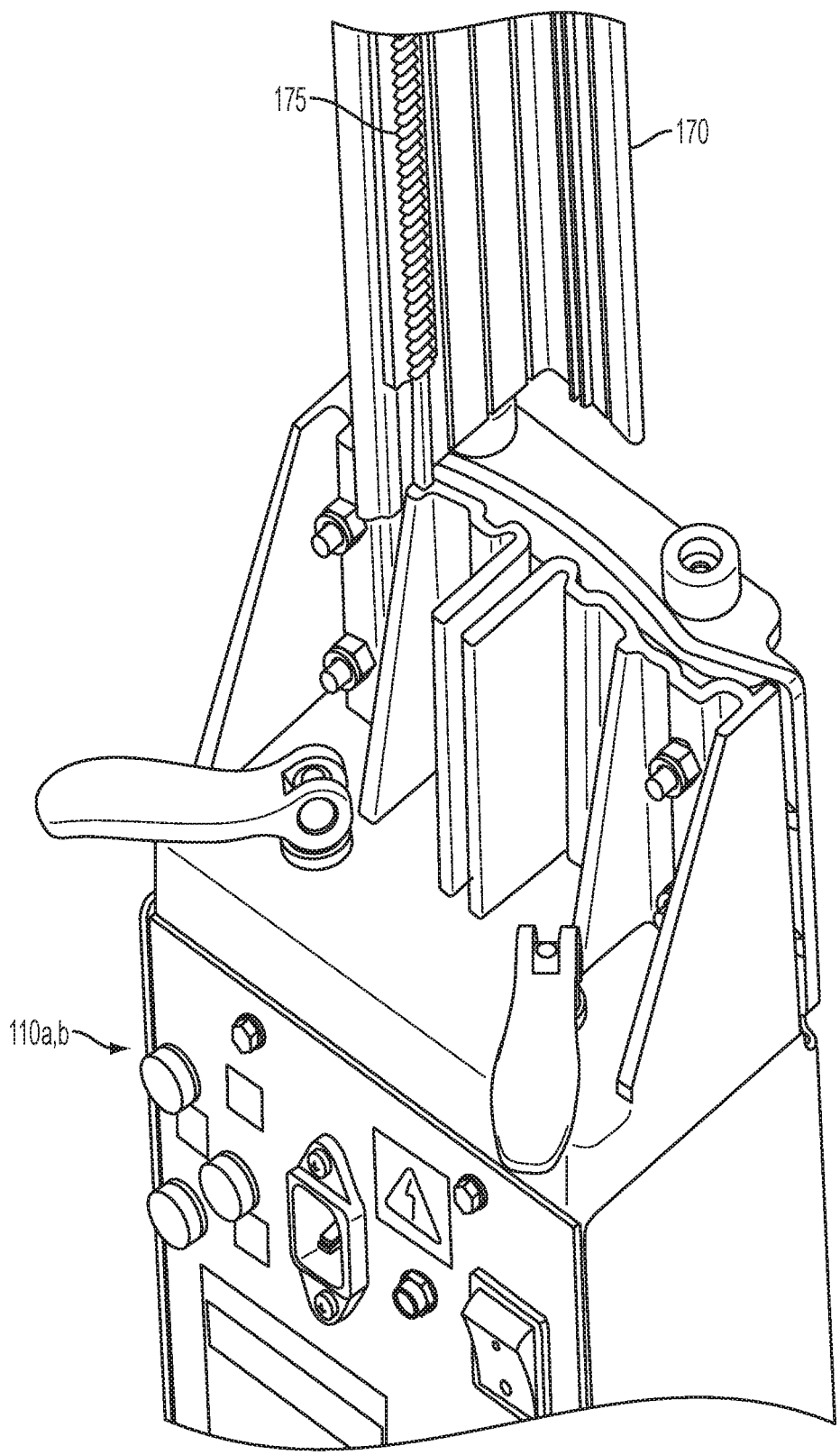
FIG. 4 is a perspective view diagrammatically illustrating an exemplary base tower assembly according to various embodiments.

As shown in FIG. 3C and FIG. 4, each camera pod 120a, 120b has a motor drive 165 to move the pod along the length of the columnar tower 115a, 115b. In exemplary embodiments, each columnar tower 115a, 115b comprises a bar 170 having a T-shaped cross section, and the bar 170 has a linear rack of gear teeth 175. Each tower's associated camera pod 120a, 120b has a slide car 180 for mounting the motor drive 165, and engaging the bar 170 to guide motion of the camera pod 120a, 120b along the bar 170. Thus, each columnar tower 115a, 115b is a supporting track for its respective camera pod 120a, 120b. The motor drive 165 of the associated camera pod has a pinion gear 185 for engaging the rack 175 to drive the camera pod 120a, 120b along a length of the bar 170. A conventional DC motor 190 can be used to move the camera pod 120a, 120b up and down the T-shaped bar 170. Slide car 180 also has a motor controller 195, such as a circuit board having a microprocessor, for receiving commands to operate the motor 190 to move its respective camera pod 120a, 120b. The motor controller's microprocessor either directly monitors and provides current to motor 190 or does so through a supporting motor controller chip.

First camera pod 120a includes a first camera board 135a including a processor for performing certain method steps disclosed herein below, including processing image data from first camera 135, computing pod movement, and sending commands to the motor controller 195 of camera pod 120a. In certain embodiments, the first camera 135 and the first camera board 135a are integrated; i.e., the camera 135 is mounted to a printed circuit board having a processor. In certain embodiments a wireless communication device is included on first camera board 135a for communicating with the wireless communication device 130 of data processor 125. Alternatively, those of skill in the art will understand that the pod's wireless communication device could instead be separate from the camera board 135a. In certain embodiments, the motor controller 195 of camera pod 120a provides power to camera 135 and has a wired serial communication connection to first camera board 135a.

Similarly, second camera pod 120b includes a second camera board 150a including a processor for performing certain method steps disclosed herein below, including processing image data from second camera 150. Second camera pod 120b further includes a third camera board 155a including a processor for performing certain method steps disclosed herein below, including processing image data from calibration camera 155. In certain embodiments, the cameras 150, 155 are each integrated with their respective camera boards 150a, 155a; i.e., each camera is mounted to a printed circuit board having a processor. One of the two camera boards 150a, 155a in the second camera pod 120a additionally includes a processor that receives the processed image data from both cameras 150, 155, computes pod movement, and sends commands to the motor controller 195 of camera pod 120b, according to the method disclosed herein below.

In certain embodiments a wireless communication device is included on one or both camera boards 150a, 155a for communicating with the wireless communication device 130 of data processor 125. Alternatively, those of skill in the art will understand that the pod's wireless communication device could instead be separate from the camera boards. In certain embodiments, the motor controller 195 of camera pod 120b provides power to cameras 150 and 155, and has a wired serial communication connection to camera boards 150a and 155a.

One of the pods 120a, 120b is placed on the left side of the vehicle 30, and the other is placed on the right side of the vehicle 30. The first and second cameras 135, 150 are oriented to capture images of targets mounted to a respective side of the vehicle 30 (see FIG. 1). The target images are used to calculate each pod's position in a conventional manner, and mathematically orient objects found by the one camera in the coordinate system of the other pod, thereby relating the two sides of the vehicle.

In a typical alignment system, it is necessary to track the vertical location of reference points on a vehicle from the level of the shop floor up to a typical maximum alignment lift height of 9 ft. In the disclosed system, the cameras move up and down along their upright assemblies to position the cameras in an optimal location to image the vehicle or any correlated objects attached to the vehicle such as wheel targets.

The movements of the two camera pods 120a, 120b up and down are kept synchronous by utilizing the calibration camera 155 and calibration target 140, along with wheel target information from the vehicle 30. In certain disclosed embodiments, the processing of this information allows the camera boards 135a, 150a, 155a to adjust the motor speed to keep the camera pods 120a, 120b in sync with each other, and adjust the pod speed to stay in synch with movement of a vehicle lift (not shown) on which the vehicle 30 can be carried while the alignment is being performed.

In the disclosed system, the pod movement is automated. The pods are positioned in the optimal locations to image the vehicle with no user intervention. The described architecture was implemented to achieve several goals using a wireless interface, including target tracking, safety, maximum component life, and reduced service time.

Figure 5:
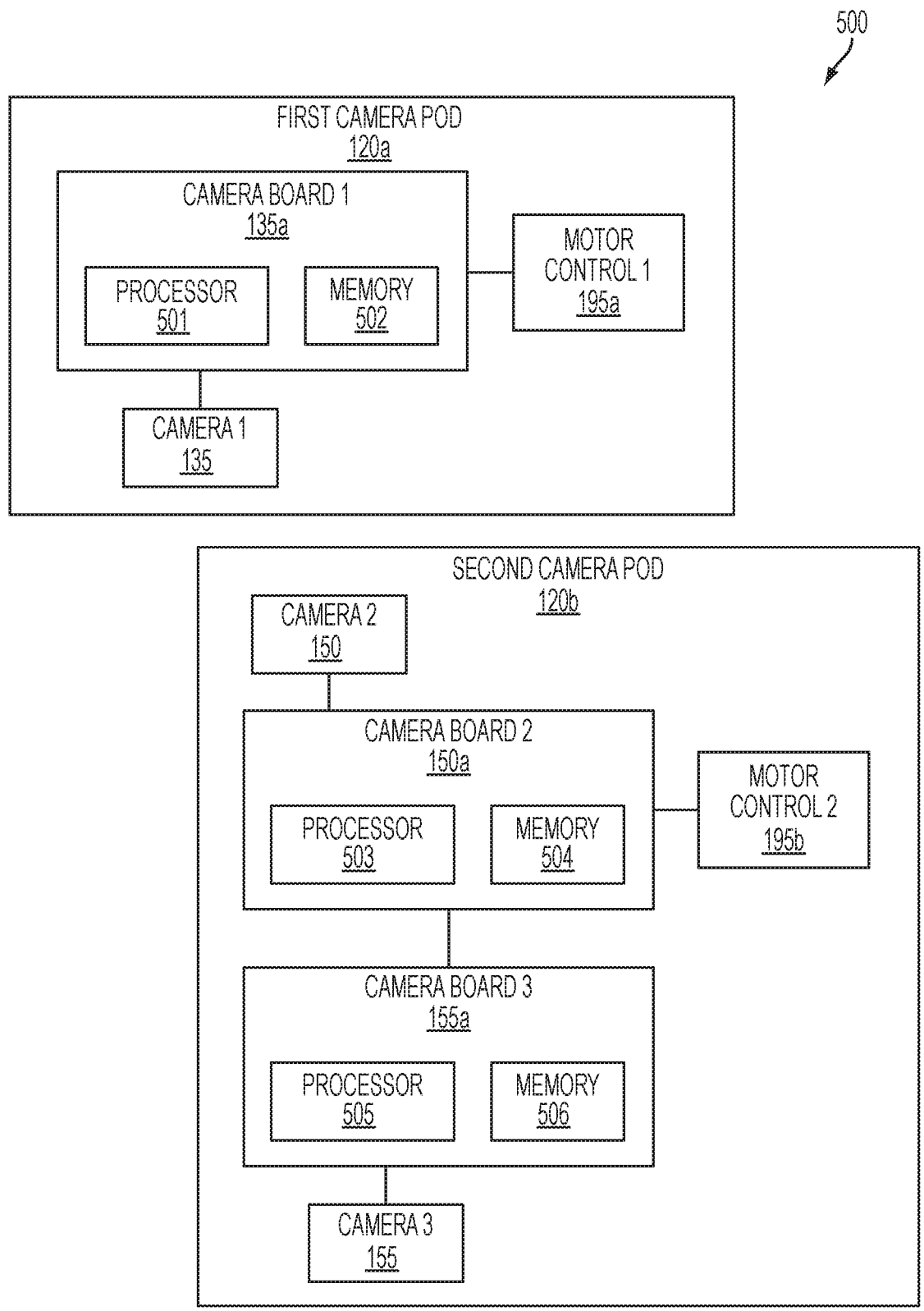
FIG. 5 is a block diagram of an exemplary vehicle alignment system in accordance with the disclosure.

FIG. 5 is a block diagram of an exemplary embodiment of a vehicle alignment system. System 500 can include the first and second camera pods 120a, 120b, which are each mounted to a separate base tower assembly 105a, 105b. First camera pod 120a can include the first camera board 135a including a processor 501 and a memory 502; and the first camera 135, which can send image data to first camera board 135a. The first camera pod 120a also can include a first motor controller 195a. Camera board 135a can transmit motor commands to first motor controller 195a.

Second camera pod 120b can include the second camera board 150a including a processor 503 and a memory 504; the second camera 150, which can send image data to second camera board 150a; the third camera board 155a including a processor 505 and a memory 506; and the third camera 155, which can send image data to the third camera board 155a. The second camera pod 120b also can include a second motor controller 195b. Second camera board 150a can transmit motor commands to second motor controller 195b.

In operation, the processor 501 will execute instructions stored on the memory 502 that cause the first camera board 135a to receive image information from first camera 135, process the image information, and generate and transmit motor commands to first motor controller 195a according to the processes shown in FIGS. 6-7 and described below. The processor 505 will execute instructions stored on the memory 506 that cause the third camera board 155a to receive image information from third camera 155, process the image information, and transmit the image processing results to the second camera board 150a according to the processes shown in FIGS. 6-7 and described below. The processor 503 will execute instructions stored on the memory 504 that cause the second camera board 150a to receive image information from second camera 150 and image processing results from the third camera board 155a, and generate and transmit motor commands to second motor controller 195b according to the processes shown in FIGS. 6-7 and described below.

Figure 6:
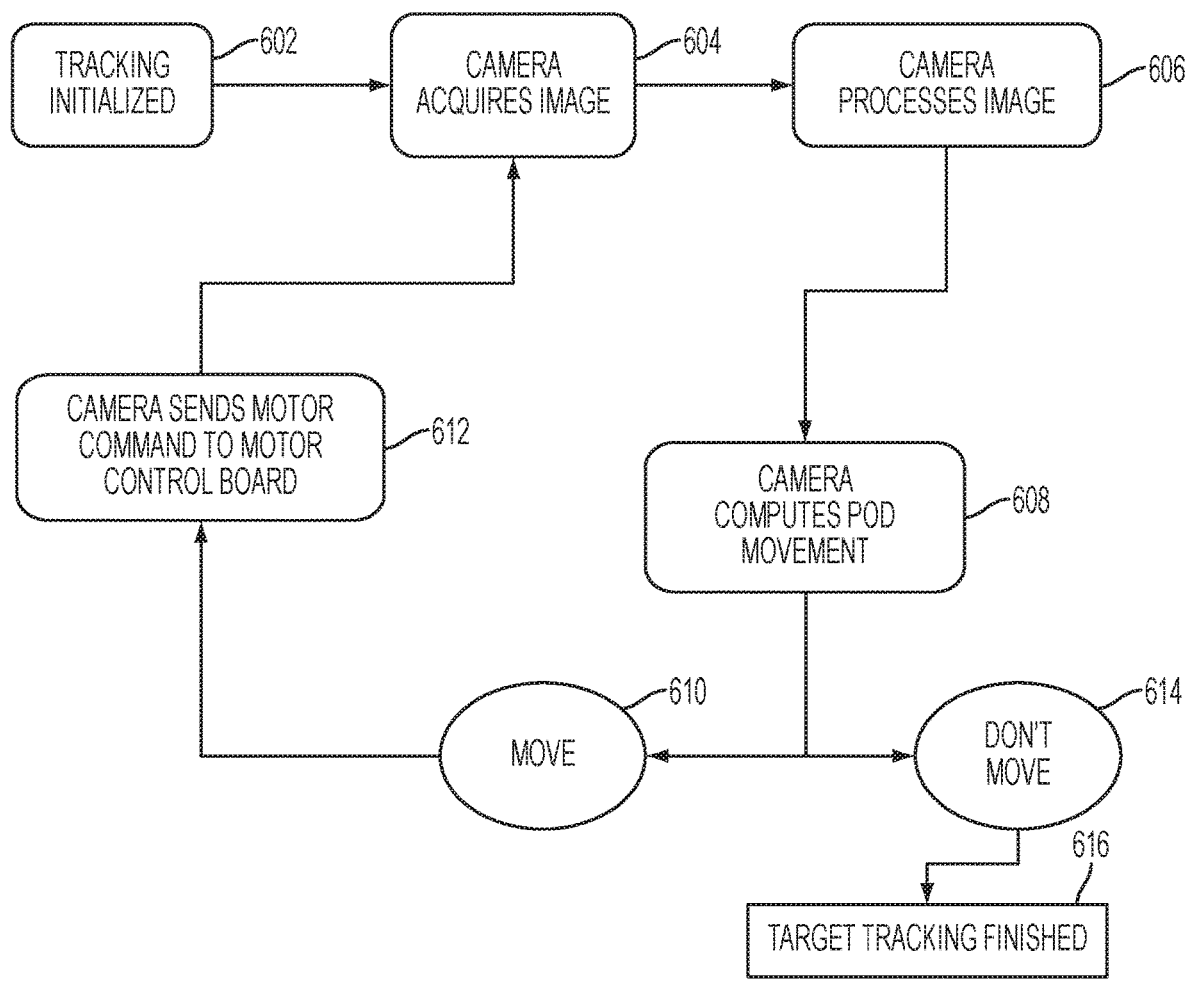
FIG. 6 is a flow chart illustrating an exemplary method of target tracking according to an embodiment of the disclosed subject matter.

FIG. 6 is a flow chart illustrating an exemplary method of vehicle tracking according to an embodiment of the disclosed subject matter. In one embodiment, the functionality of the flow diagrams of FIG. 6 and FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA" etc.), or any combination of hardware and software.

At 602, tracking is initialized. At 604, a tracking camera such as camera(s) 135 and/or 150 of FIG. 5, or a calibration camera such as camera 155 of FIG. 5, acquires an image of its corresponding target(s).

At 606, a processor coupled to the camera (for example, processors 501, 503, and/or 505 of FIG. 5) processes the camera's image data. The processor can receive the image data from the camera and calculate the position of each vehicle wheel plane based on the location of the target(s) as indicated in the received image data.

At 608, the processor computes pod movement. Computing pod movement can include calculating an optimal location of each pod in relationship to the vehicle or vehicle targets.

At 610, the processor determines to move the autonomous camera pod based on, for example, the optimal location calculated at 608. At 612, the processor sends motor commands to a motor control board of the pod; for example, motor control boards 195a and/or 195b of FIG. 5. The commands can direct the motor control board to move the pod to the optimal location through a motor control interface.

At 614, the processor determines that the pod is not to be moved and processing continues to 616 where processing ends.

In some embodiments, such as an embodiment including second camera pod 120b in FIG. 5, because both the forward facing camera (e.g., camera 150) and the camera facing the other pod (e.g., calibration camera 155) are connected to the motor control board 195b, information from each camera can be used within the second camera pod 120b to position the pod both optimally for the vehicle and at the same height from the ground as the other pod (e.g., pod 120a of FIG. 5). All of this activity can be conducted by processors 503 and 505 within the second camera pod 120b, without requiring the use of wireless communication for direction from an outside processing unit, such as data processor 125.

In some embodiments, the pods can be controlled directly from an outside processing unit through a wireless interface. In such embodiments, the speed of the pod response over the wireless is critical to follow a moving vehicle. The microprocessor on the motor control can allow direct measurement or calculation of motor speed and motor position. In such embodiments, simple commands are used over the wireless interface, such as a location or a run speed and run interval. All other information needed to achieve the command provided over the wireless interface is calculated and executed by each pod (e.g., by each pod's the motor control board).

In some embodiments, the speed of each pod can be controlled adaptively in response to camera data. In such embodiments, direct control of the motor by the motor control board can allow for greater control of the motor speed. In such embodiments, information from the camera can be used to calculate the speed of the vehicle and match this speed with the motor speed so that the vehicle remains in the view of the camera. Information from the left pod camera that faces the right pod can be used to match the speed between the pods and keep the pods at the same height from the ground.

In some embodiments, an optimal positioning of the pods can be determined even when one or more reference points or wheel targets are not visible. Conventionally, the positioning of the cameras on a movable camera aligner is done by placing the average position of the front and rear target in the center of the camera view by moving the cameras up or down. If one target is blocked, then the cameras are positioned to view the other target at one of the extremes of the cameras' Field of View (FOV) to best enable the blocked target to be found. For example, if the rear target is missing, then the cameras are positioned to place the front target at the bottom of the cameras' FOV to give the most FOV to find the front target. However, this conventional approach can result in significant camera movement if a target is temporarily or repeatedly blocked.

In some embodiments, once all four targets on a vehicle are located, a vertical location and orientation representing the position of the vehicle is created. All four wheel targets are related to this virtual location. This allows the pods to be optimally and repeatably placed in relationship to the vehicle as long as at least one target or reference point is visible.

The goal of this automated tracking process is to optimally locate two pods in relationship to a vehicle such that all reference points, in this example wheel targets, are in view of the cameras on the pods. Once an initial state is established where all reference points are in view, it is desired to maintain the targets in view as the vehicle is moved up and down and when targets are removed or blocked to facilitate maintenance on the vehicle.

The following disclosed procedure maintains the pods in the correct location after the initial state is established. The goal is to maintain optimal location of the pods at all times so that the user does not have to wait for the pods to position after, for example, moving the vehicle, removing some of the targets, and/or blocking a target. It is assumed that at least one target is always visible.

Once the initial state is achieved where all four wheel targets are visible, the location of each target is recorded. A central location for the vehicle is established by averaging the location of all wheel targets. This will be referred to as the vehicle plane. Transformations from each target to the center of the vehicle plane are created. During target tracking, each of the wheel targets will be assigned a pixel location on its camera image sensor based on the pixel location of the center most dot on the target. The Pods will be moved up and down until the pixel location of the front target and the rear target are both equidistant from the center line of the camera sensor with the rear target above the center line and the front target below the center line.

If any target or combination of targets (up to 3) is removed or blocked, the vehicle plane is calculated using the transformation from all of the remaining wheel targets. An average vehicle plane is calculated from this result. Using the vehicle plane and the missing wheel target's transformation, the missing wheel target's location is found. The pixel location of the center dot will then be established for each target (both present and missing) and this will be used to position the pods such that the pixel location of the front target and the rear target are both equidistant from the center line of the camera sensor with the rear target above the center line and the front target bellow the center line.

Figure 7:
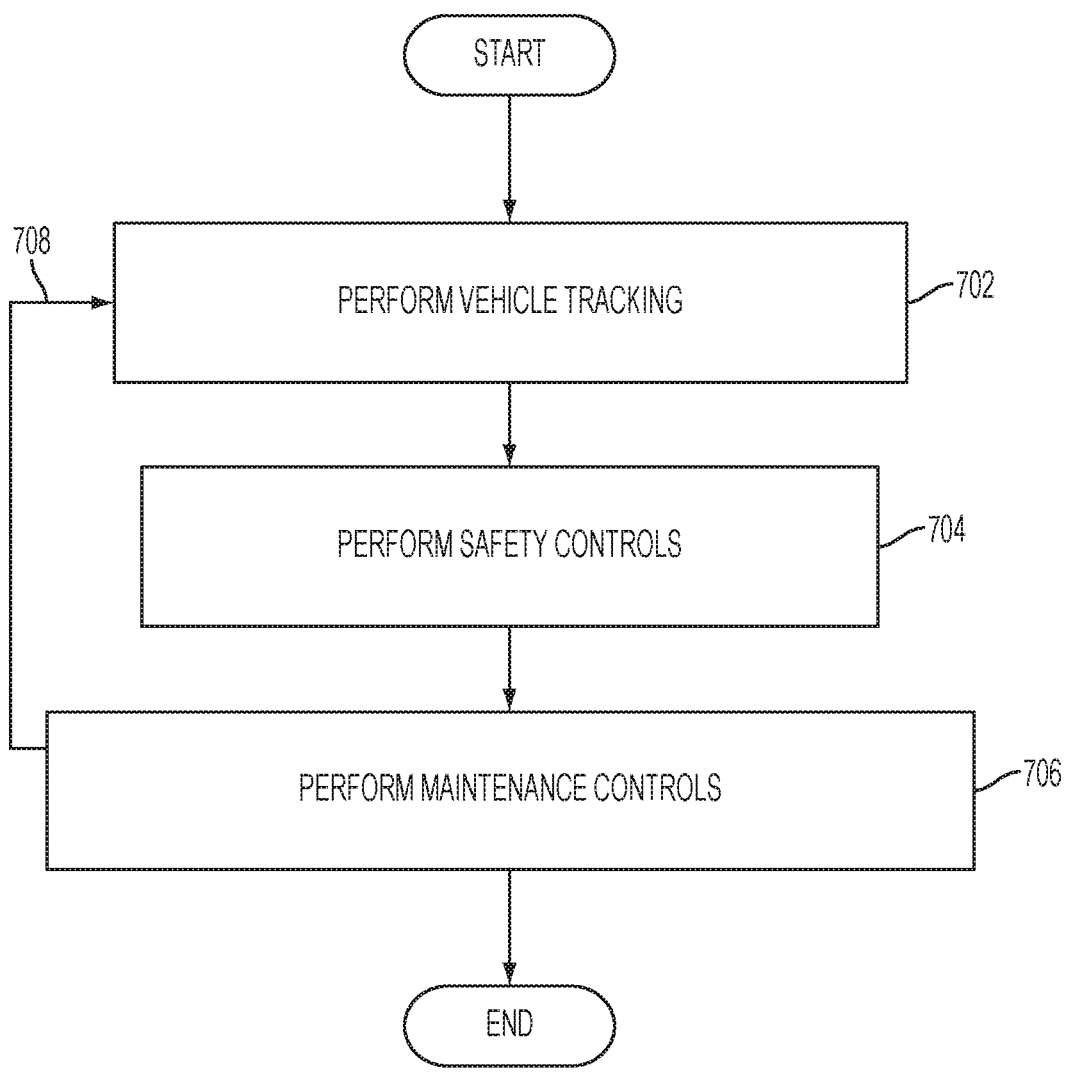
FIG. 7 is a flow chart illustrating an exemplary method according to an embodiment of the disclosed subject matter.

FIG. 7 is a flow chart illustrating an exemplary method of vehicle alignment according to an embodiment of the disclosed subject matter.

At 702, vehicle target tracking can be performed, such as, for example, the method of vehicle tracking described above with respect to FIG. 6.

At 703, safety controls can be performed. For example, in some embodiments, motor control is provided within each pod 120a, 120b that provides several opportunities to improve the safety of this system for the user. Both pods can move independently of user control. It is possible for the user to come in contact with a pod or try to physically move the pods into a desired position while it is in motion. Safety features can include, for example, automatic motor stop on stall and/or lock-out of motor control if user manually moves a pod.

In some embodiments, automatic motor stall detection is provided in which the microprocessor on the motor control board 195a, 195b directly monitors the motor current and voltage multiple (e.g., thousands) of times per second. If a user comes in contact with the pod(s) 120a, 120b and resists the pod's motion, this is detected within 100 ms and the pod's motion is stopped.

In certain embodiments, motor control is locked out after physical movement of a pod. Using the same methodology described above, the microprocessor on the motor control board 195a, 195b detects if a pod is physically moved by the user. If this occurs, control of the motors is locked out for a predetermined time to allow the user to move out of contact with the pod.

At 706, maintenance controls can be performed. In some embodiments, the direct control of the motor 190 within each pod 120a, 120b is used to improve component life and reduce service time in the event of a component failure, by implementing at least one of motor soft start, detection of mechanical drag, on-board motor drive diagnostics, and live speed calibration.

Motor soft start: The microprocessor on the motor control board 195a, 195b is used to slowly accelerate and decelerate the motor 190 during motor start, motor stop, speed change, and direction change. This reduces wear on the motor by reducing the surge current passed through the motor coils.

This also reduces wear on the gears, mechanical linkages, and mounting hardware by reducing the acceleration and thereby the force on these components during transient movement conditions.

Detection of mechanical drag: Power consumption of the motor 190 is characterized by the microprocessor on its respective motor control board 195a, 195b. Increase in power consumption beyond an established threshold indicates mechanical drag in the system. The user is notified by the microprocessor on the motor control board through the wireless interface that this condition is present and the unit is in need of service. Excessive drag and/or friction is thereby detected before damage to the motor or motor drive components occurs.

On board motor drive diagnostics: The voltages, currents, and temperatures on the motor control board 195a, 195b are measured by the microprocessor on this board. The overall function of the board and motor are determined and reported through the user interface of data processor 125 to the user. If a component fails, the user is notified. This reduces trouble shooting time by a technician in the field. In addition, all raw diagnostic data is reported through the wireless interface for display to aid a technician in troubleshooting the unit.

Live speed calibration: In some motor control systems, it is necessary to calibrate the motor drive to the motor speed or to directly measure the motor speed in order to perform controlled and coordinated motor movements. In the disclosed system, it is necessary to coordinate the left and right pods to maintain the two pods at the same height from the ground. The camera system in the left pod (i.e., the pod 120b with two cameras) is used to calculate the relative speed of the right pod 120a and automatically calibrate and correct the speed of the left pod 120b any time the pods are moving. This allows the pods to move together at the same speed without calibration to the system or direct speed measurement. It also allows the system to adapt its speed to compensate for drag on a pod or wear in the motor system, keeping the two pods movements synchronized over the life of the product.

It will be appreciated that the method of FIG. 7 can be repeated in whole or in part, an example of which is provided as step 708. Although not explicitly shown, it will also be appreciated that functionality described at 702-706 can be performed concurrently and/or in an overlapping manner.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described several examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It will be appreciated that the modules, processes, systems, and sections described above can be implemented in hardware, hardware programmed by software, software instruction stored on a non-transitory computer readable medium or a combination of the above. For example, a method for tracking a vehicle during vehicle alignment can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of machine vision vehicle alignment and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, improved motor control systems and methods for a self-calibrating multi-camera alignment system. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A vehicle alignment system adapted to track a vehicle, the system comprising:
   a first camera pod mounted to move relative to the vehicle, the first camera pod comprising:
   a first motor drive adapted to move the first camera pod relative to the vehicle,
   a first camera adapted to capture image data of a first target mounted to the vehicle, the first camera generating first image data, and
   a calibration target disposed in a fixed relationship to the first camera,
   a second camera pod mounted to move relative to the vehicle, the second camera pod comprising:
   a second motor drive adapted to move the second camera pod relative to the vehicle,
   a second camera adapted to capture image data of a second target mounted to the vehicle, the second camera generating second image data, and
   a calibration camera disposed in a fixed relationship to the second camera adapted to capture image data of the calibration target, the calibration camera generating calibration image data,
   one or more data processors adapted to:
   receive the first image data from the first camera,
   determine, based at least in part on the first image data, whether to cause the first camera pod to move relative to the vehicle,
   transmit, when the one or more data processors determine to cause the first camera pod to move relative to the vehicle, a first motor command to the first motor drive thereby causing the first camera pod to move relative to the vehicle,
   receive the calibration image data from the calibration camera,
   determine, based at least in part on the calibration image data, whether to cause the second camera pod to move relative to the vehicle, and
   transmit, when the one or more data processors determine to cause the second camera pod to move relative to the vehicle, a second motor command to the second motor drive, thereby causing the second camera pod to move relative to the vehicle.

2. The system of claim 1, wherein the vehicle is mounted on a lift, and the one or more data processors are adapted to control the first and second motor drives to move the first and second camera pods when the vehicle is raised or lowered on the lift such that the first and second cameras continuously capture image data of the first and second targets, respectively.

3. The system of claim 2, wherein the one or more data processors are adapted to maintain the first and second camera pods at a substantially equal height from a reference plane based at least in part on the calibration image data generated by the calibration camera when the first and second camera pods are moving.

4. The system of claim 1, wherein third and fourth targets are mounted to the vehicle, the first camera is adapted to capture image data of the third target, and the second camera is adapted to capture image data of the fourth target;
   wherein the one or more data processors are adapted to process the image data of the first and third targets from the first camera and the second and fourth targets from the second camera, respectively, to generate a vertical location and orientation representing a position of the vehicle, and to move the first and second camera pods to an optimal location based on the representation of the vehicle position when only one of the targets is being imaged by one of the first and second cameras.

5. The system of claim 1, wherein the first and second motor drives further comprise a first and second motor, respectively.

6. The system claim 5, wherein the one or more data processors monitor an operating voltage and current of the first and second motors, respectively, and stop the respective motor when the voltage and/or current indicates a predetermined increase in resistance to a motion of the respective camera pod.

7. The system of claim 5, wherein the one or more data processors monitor an operating voltage and current of the first and second motors, respectively, and lock out movement of the respective motor for a predetermined time period when the voltage and/or current indicate manual movement of the respective camera pod by a user.

8. The system of claim 5, wherein the one or more data processors are adapted to limit acceleration and deceleration of the first and second motors, respectively, to a predetermined value, to reduce wear on the motors and motor drives.

9. The system of claim 5, wherein the one or more data processors are adapted to monitor a power consumption of the first and second motors, respectively, and to send a user notification, via a wireless interface, when the power consumption exceeds a predetermined level.

10. The system of claim 9, wherein the user notification is a message that service is needed.

11. The system of claim 1, wherein the first and second motor drives further comprise a first and second motor control board, respectively; and
wherein the one or more data processors are adapted to monitor an operating voltage, an operating current, and a temperature of the first and second motor control boards, respectively, and to send a notification, via a wireless interface, indicating that a component of the respective motor control board has failed based on the monitored voltage, current, and temperature.

12. The system of claim 1, wherein when the first and second camera pods are moving relative to the vehicle, the calibration image data from the calibration camera of the second camera pod is used by the one or more data processors to calculate a relative speed of the first camera pod and to adjust a speed of the second camera pod such that the first and second camera pods move at substantially the same speed.

13. A method for tracking a vehicle during vehicle alignment, the method comprising:
providing a vehicle alignment system comprising:
a first camera pod mounted to move relative to the vehicle and comprising a first motor drive and a first camera to image a first target mounted to the vehicle, and
a second camera pod mounted to move relative to the vehicle and comprising a second motor drive, a second camera, and a calibration camera;
acquiring, by the first camera, an image of the first target mounted to the vehicle;
receiving, at one or more data processors, first image data from the first camera;
calculating, at the one or more data processors, a first optimal location of the first camera pod;
determining, at the one or more data processors, whether to move the first camera pod;
transmitting, by the one or more data processors, when the one or more data processors determines to move the first camera pod, a first motor command to the first motor drive thereby causing the first camera pod to move relative to the vehicle to the first optimal location;
acquiring, by the second camera, an image of a second target mounted to the vehicle and, by the calibration camera, an image of a calibration target mounted to the first camera pod;
receiving, at the one or more data processors, calibration image data from the calibration camera;
calculating, at the one or more data processors, an optimal location of the second camera pod based at least in part on the received calibration image data;
determining, at the one or more data processors, whether to move the second camera pod; and
transmitting, by the one or more data processors, when the one or more data processors determines to move the second camera pod, a second motor command to the second motor drive thereby causing the second camera pod to move relative to the vehicle to the second optimal location.

14. The method of claim 13, wherein the vehicle is mounted on a lift, and the one or more data processors are adapted to control the first and second motor drives to move the first and second camera pods when the vehicle is raised or lowered on the lift such that the first and second cameras continuously capture image data of the first and second targets, respectively.

15. The method of claim 13, wherein the first and second motor drives comprise a first and second motor, respectively; and
wherein the one or more data processors are adapted to monitor an operating voltage and current of the first and second motors, respectively, and stop the respective motor when the voltage and/or current indicates a predetermined increase in resistance to a motion of the respective camera pod.

16. The method of claim 13, wherein the first and second motor drives comprise a first and second motor, respectively; and
wherein the one or more data processors are adapted to monitor a power consumption of the first and second motors, respectively, and to send a user notification, via a wireless interface, when the power consumption exceeds a predetermined level.

17. A non-transitory computer readable medium having instructions stored thereon that, when executed by one or more processors operably connected to a first camera pod mounted to move relative to the vehicle, cause the one or more processors to track a vehicle during vehicle alignment, the tracking comprising:
receiving vehicle target image data from a vehicle target camera and calibration target image data from a calibration camera, the vehicle target camera being adapted to acquire images of a target mounted to a vehicle, the calibration camera being adapted to acquire images of a calibration target mounted to a second camera pod;
calculating an optimal location of the first camera pod based at least in part on the received calibration target image data;
determining, responsive to the calculating, whether to move the first camera pod relative to the vehicle; and
transmitting, when it is determined to move the first camera pod, a motor command to a motor drive of the first camera pod, thereby causing the first camera pod to move relative to the vehicle to the optimal location.

18. The non-transitory computer readable medium of claim 17, wherein the vehicle is mounted on a lift, and the optimal location is calculated such that the transmitting causes the motor drive to move the first camera pod when the vehicle is raised or lowered on the lift such that the vehicle target camera continuously captures image data of the vehicle target.

19. The non-transitory computer readable medium of claim 17, wherein the motor drive further comprises a motor, the tracking further comprising:
monitoring an operating voltage and current of the motor and stopping the motor when the voltage and/or current indicates a predetermined increase in resistance to a motion of the first camera pod.

20. The non-transitory computer readable medium of claim 17, wherein the motor drive comprises a motor, the tracking further comprising:
monitoring a power consumption of the motor and sending a user notification, via a wireless interface, when the power consumption exceeds a predetermined level.

* * * * *